United States Patent
Wu

(10) Patent No.: US 9,232,068 B2
(45) Date of Patent: *Jan. 5, 2016

(54) CONFERENCE CALL AUTHENTICATION UTILIZING PASSCODES PERSONAL TO USERS

(71) Applicant: International Business Machines Corporation, Armonk, NY (US)

(72) Inventor: Frederick Y. Wu, Greenwich, CT (US)

(73) Assignee: International Business Machines Corporation, Armonk, NY (US)

(*) Notice: Subject to any disclaimer, the term of this patent is extended or adjusted under 35 U.S.C. 154(b) by 216 days.

This patent is subject to a terminal disclaimer.

(21) Appl. No.: 13/967,839

(22) Filed: Aug. 15, 2013

(65) Prior Publication Data

US 2014/0321631 A1   Oct. 30, 2014

Related U.S. Application Data

(63) Continuation of application No. 13/870,338, filed on Apr. 25, 2013.

(51) Int. Cl.

| H04M 3/56 | (2006.01) |
|---|---|
| H04L 29/06 | (2006.01) |
| H04M 3/38 | (2006.01) |
| H04L 12/18 | (2006.01) |
| H04W 12/06 | (2009.01) |

(52) U.S. Cl.
CPC ............. *H04M 3/56* (2013.01); *H04L 12/1818* (2013.01); *H04L 63/083* (2013.01); *H04M 3/382* (2013.01); *H04M 3/563* (2013.01); *H04W 12/06* (2013.01)

(58) Field of Classification Search
CPC ....... H04M 3/56; H04M 3/382; H04M 3/563; H04L 12/1818; H04L 63/083; H04W 12/06
USPC .......................... 455/416; 379/202.01, 204.01
See application file for complete search history.

(56) References Cited

U.S. PATENT DOCUMENTS

| 6,798,753 | B1* | 9/2004 | Doganata et al. ............. 370/260 |
|---|---|---|---|
| 7,266,188 | B2 | 9/2007 | Carlson |
| 8,654,953 | B2* | 2/2014 | Boss et al. ............... 379/202.01 |
| 2005/0069115 | A1 | 3/2005 | McKnight et al. |
| 2007/0111743 | A1* | 5/2007 | Leigh et al. .................... 455/518 |
| 2008/0037746 | A1* | 2/2008 | Dufrene et al. ........... 379/201.01 |
| 2008/0037751 | A1* | 2/2008 | Aldrey et al. ............. 379/202.01 |
| 2008/0205616 | A1* | 8/2008 | Teng et al. ............... 379/202.01 |
| 2008/0226051 | A1* | 9/2008 | Srinivasan ............... 379/202.01 |
| 2010/0061538 | A1* | 3/2010 | Coleman et al. ......... 379/202.01 |
| 2011/0228922 | A1* | 9/2011 | Dhara et al. ............. 379/202.01 |

(Continued)

FOREIGN PATENT DOCUMENTS

| EP | 2219358 A1 | 8/2010 |
|---|---|---|
| EP | 2226996 A1 | 9/2010 |

(Continued)

*Primary Examiner* — Sharad Rampuria
(74) *Attorney, Agent, or Firm* — Louis J. Percello; Ryan, Mason & Lewis, LLP

(57) ABSTRACT

A system comprises a plurality of user devices and a conference call bridge connected to the plurality of end user devices via one or more networks. The conference call bridge is configured to connect to a given one of the plurality of user devices, receive a passcode from the given user device, and authenticate the given user device using the passcode. The passcode is personal to the given user.

15 Claims, 8 Drawing Sheets

(56) References Cited

U.S. PATENT DOCUMENTS

2012/0069983 A1* 3/2012 Sall .................. 379/202.01
2012/0188330 A1 7/2012 Turner
2012/0269334 A1 10/2012 Goguen et al.

FOREIGN PATENT DOCUMENTS

EP  2487859 A1  8/2012
EP  2501118 A2  9/2012

* cited by examiner

501

| ID | NAME | MODERATOR ID | START TIME | END TIME |
|---|---|---|---|---|
| 358883 | PROJECT ALPHA DEVELOPMENT PLAN | 42842341 | 2013.01.28:10:00:00 | 2013.01.28:10:30:00 |
| 374366 | 2013 DEPARTMENT STRATEGY | 53243819 | 2013.01.28:10:00:00 | 2013.01.28:12:00:00 |

503

| ID | LAST NAME | FIRST NAME |
|---|---|---|
| 39137253 | SMITH | ROBERT |
| 33927668 | JONES | ARNOLD |
| 42842341 | COLLIER | SAMANTHA |
| 53243819 | WILLIAMS | TONY |
| 59345122 | MILLER | SUSAN |

505

| RECORD | CONFERENCE ID | CALLER ID |
|---|---|---|
| 39137253 | 358883 | 39137253 |
| 33927668 | 358883 | 33927668 |
| 37244231 | 358883 | 42842341 |
| 35227724 | 374366 | 33927668 |
| 34699563 | 374366 | 53243819 |
| 35888645 | 374366 | 59345122 |

CONFERENCE CALL AUTHENTICATION UTILIZING PASSCODES PERSONAL TO USERS

CROSS-REFERENCE TO RELATED APPLICATION

This application is a Continuation of U.S. patent application Ser. No. 13/870,338, filed on Apr. 25, 2013, the disclosure of which is fully incorporated herein by reference.

FIELD

The field relates to communications and, more particularly to techniques for managing communications.

BACKGROUND

Conference bridges are utilized to manage conference calls for various businesses, social groups and other entities. A conference bridge allows multiple participants to connect and establish a conference call with one another. Each conference call typically has a moderator and one or more participants. The moderator has access to one or more functions that are not available to other participants of the conference call. For a given conference call, participants must enter a passcode to join the conference call. The moderator may use a different passcode than other participants of a given conference call to access the moderator functions. To transfer from one conference call to another, a participant must disconnect from a first conference call, re-dial the conference bridge and enter a new passcode for a second conference call.

SUMMARY

According to one embodiment of the invention, a method comprises the steps of connecting to a conference call bridge, providing a passcode to the conference call bridge and authenticating to the conference call bridge using the passcode. The passcode is personal to a given user. The connecting, providing and authenticating steps are performed by at least one processing device.

According to another embodiment of the invention, a method comprises the steps of connecting to a given one of a plurality of user devices, receiving a passcode from the given user device and authenticating the given user device using the passcode. The passcode is personal to a given user. The connecting, receiving and authenticating steps are performed by at least one processing device.

According to another embodiment of the invention, a system comprises a plurality of user devices and a conference call bridge connected to the plurality of end user devices via one or more networks. The conference call bridge is configured to connect to a given one of the plurality of user devices, receive a passcode from the given user device, and authenticate the given user device using the passcode. The passcode is personal to the given user.

These and other embodiments of the invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for managing conference calls using a conference bridge. However, it is to be understood that embodiments of the invention are not limited to the illustrative methods, systems and devices described but instead are more broadly applicable to other suitable methods, systems and devices.

Conventional techniques for managing conference calls have a number of disadvantages and drawbacks. Participants in conference calls are required to look up or memorize unique passcodes for each conference call, which is inconvenient and time consuming for such participants. In some instances, participants must look up or memorize unique passcodes for each moderator rather than for each call. In addition, a user may be a participant for a number of conference calls, scheduled sequentially or for similar periods of time. To switch from one conference call to another, the user must disconnect from a first conference call and then dial a number and enter a new passcode for a second conference call.

It is also difficult to determine which participants are connected to a given conference call at a particular point in time. Many conventional techniques prompt participants to announce their entrance into a call. Thus, each time a participant joins a call, the flow of conversation may be interrupted to announce the entry of a new participant and for existing participants to announce themselves to the joining participant.

Embodiments of the invention overcome one or more of the above-noted drawbacks by utilizing conference call management techniques and conference call bridge systems wherein passcodes for accessing the system and calls are personal to particular users, rather than unique passcodes for each conference call. In some embodiments, conference call bridge systems integrate calendar systems for retrieval and management of call schedules for participants. Conference call bridge systems in embodiments of the invention connect participants to conference calls and provide techniques for informing moderators of active participants through associations between the personal passcodes and participant identities. Conference call bridge systems in embodiments of the invention also allow for management of concurrent conference calls, including permitting participants to switch between two or more conference calls without disconnecting from the conference call bridge or re-authenticating to the conference call bridge.

Figure 1:
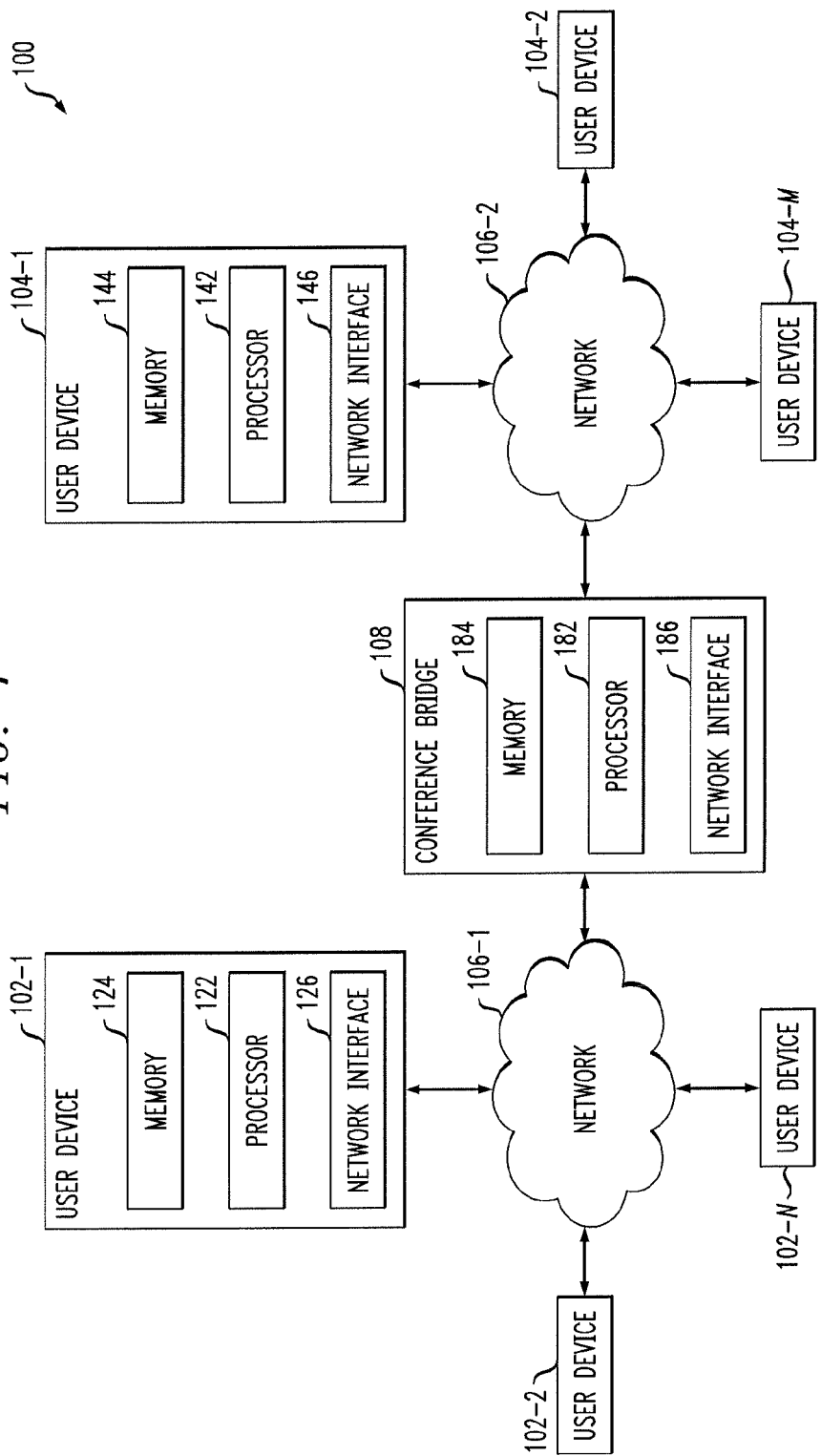
FIG. 1 illustrates a conference call system, according to an embodiment of the invention.

FIG. 1 illustrates a conference call system 100. The system 100 includes a number of user devices 102-1, 102-2, ... 102-N connected to a network 106-1 and a number of user devices 104-1, 104-2, ... 104-M connected to a network 106-2. A conference bridge 108 is coupled between the networks 106-1 and 106-2.

User device 102-1 comprises a processor 122, a memory 124 and a network interface 126. Similarly, user device 104-1 comprises processor 142, memory 144 and network interface 146. The conference bridge 108 also comprises a processor 182, a memory 184 and a network interface 186. The processors 122, 142, 182 may comprise a microprocessor, a microcontroller, an application-specific integrated circuit (ASIC), a field programmable gate array (FPGA) or other type of processing circuitry, as well as portions or combinations of such circuitry elements. The memories 124, 144, 184 may comprise electronic memory such as random access memory (RAM), read-only memory (ROM), optical and magnetic disks, or other types of memory, in any combination. The network interfaces 126, 146, 186 comprise circuitry and other elements used to interface the user device 102-1, user device 104-1 and conference bridge 108 to networks 106-1, 106-2 and other system components. Such circuitry may comprise conventional transceivers of a type well known in the art. While not explicitly shown, user devices 102-2 to 102-N and user devices 104-2 to 104-M may also comprise processors, memories, and network interfaces as well as other circuitry and elements.

The networks 106-1 and 106-2 may be various types of networks, including combinations of network types. Network types include, by way of example, a wide area network (WAN), a local area network (LAN), a satellite network, a public switched telephone network (PSTN) or other telephone network, a cellular network, the Internet, and various portions of combinations of these and other network types.

The number N of user devices 102 and the number M of user devices 104 may be any arbitrary number. In addition, while FIG. 1 illustrates a system 100 with two networks 106-1 and 106-2, embodiments of the invention may include systems wherein groups of user devices connect to a conference bridge using a single network, or more than two different networks.

Figure 2:
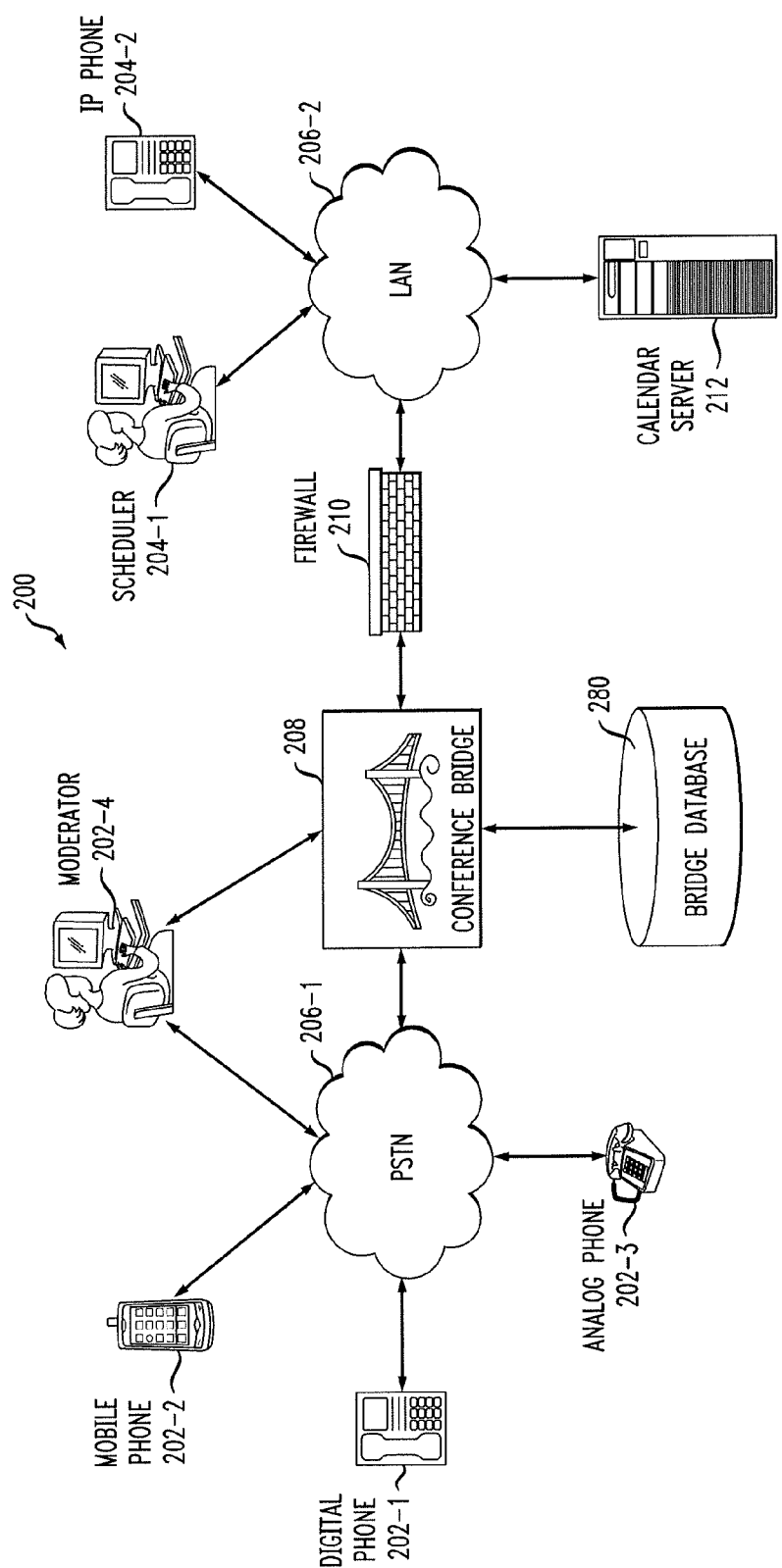
FIG. 2 illustrates another conference call system, according to an embodiment of the invention.

FIG. 2 illustrates a conference call system 200. In the system 200, a number of user devices connect to a PSTN 206-1, and a number of user devices connect to a LAN 206-2. A digital phone 202-1, mobile phone 202-2, analog phone 202-3 and a moderator 202-4 connect to the PSTN 206-1. The moderator 202-4 may utilize a variety of devices to connect to the PSTN 206-1. A scheduler 204-1 and an internet protocol (IP) phone 204-2 connect to LAN 206-2. The scheduler 204-1 may connect to the LAN 206-2 using a variety of user devices. It is important to note that embodiments of the invention are not limited solely to the specific number and arrangement of user devices shown in FIG. 2. For example, in some embodiments more than one mobile phone, digital phone, or analog phone may connect to PSTN 206-1. Similarly, a number of IP phones may connect to LAN 206-2. In addition, user devices may connect to a conference bridge through one or more other networks and network types.

While FIG. 2 shows a system 200 wherein the moderator 202-4 connects to the conference bridge 208 through the PSTN 206-1 and the scheduler 204-1 connects to the conference bridge 208 through LAN 206-2, embodiments of the invention are not limited to this arrangement. For example, the moderator may connect to the conference bridge through a LAN, or the scheduler 204-1 may connect to the conference bridge 208 through a PTSN. The moderator and scheduler may also connect to the conference bridge 208 from a same network. As another example, in some embodiments the scheduler and moderator may be the same. In addition, a participant at a given user device such as the mobile phone 202-2 may be a moderator or scheduler of one or more conference calls.

FIG. 2 shows the moderator 202-4 connected to both the PSTN 206-1 and conference bridge 208 to reflect special permissions or features which may be available to a moderator compared to other participants in a conference call, as will be discussed in further detail below. The moderator 202-4 and conference bridge 208, however, need not establish a connection over a separate network or network interface.

A calendar server 212 may also connect to the LAN 206-2. The LAN 206-2 may connect to the conference bridge 208 through a firewall 210. While FIG. 2 shows a system 200 wherein the calendar server 212 is private (i.e., behind firewall 210), in other embodiments of the invention the calendar server 212 may be considered public (i.e., not behind a firewall). The calendar server 212 may be implemented within a conference bridge or bridge database in other embodiments of the invention.

The PSTN 206-1 and LAN 206-2 connect to a conference bridge 208. The conference bridge 208 may connect to a bridge database 280. While FIG. 2 shows an arrangement wherein the bridge database 280 is external to the conference bridge 208, in other embodiments a bridge database may be internal to a conference bridge rather than external to a conference bridge. The conference bridge 208 may also connect to the bridge database 280 over one or more networks.

In addition, it is important to note that although system 100 in FIG. 1 and system 200 in FIG. 2 show arrangements with only a single conference bridge, embodiments of the invention are not limited to these arrangements. Instead, in some embodiments user devices may be configured to connect to a number of distinct conference bridges, or to connect to a pool of two or more conference bridges which share a bridge database.

Figure 3:
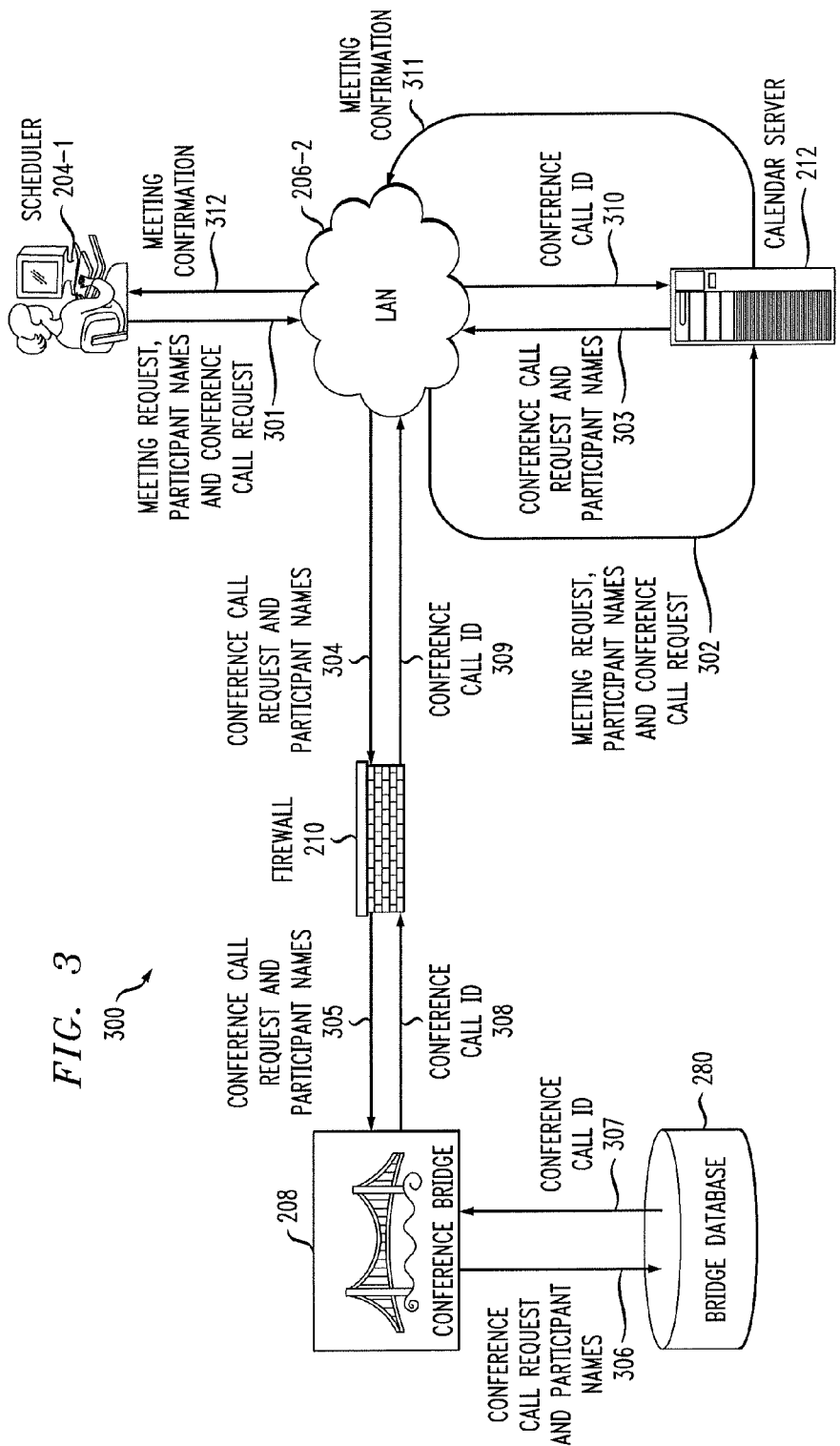
FIG. 3 illustrates scheduling a conference call in the system of FIG. 2, according to an embodiment of the invention.

FIG. 3 illustrates a process flow 300 of scheduling a conference call in the system of FIG. 2. Some of the elements of system 200 in FIG. 2 are omitted in FIG. 3 for clarity of illustration. The flow 300 begins with step 301, with the scheduler 204-1 requesting a meeting. The request for a meeting specifies whether a conference call is requested, and the participants for the meeting and the conference call. Next, the LAN 206-2 forwards 302 the meeting request, conference call request and participant names to the calendar server 212. The calendar server 212 will schedule a meeting, and forward 303 the conference call request and participant names back to the LAN 206-2. The calendar server 212 may check permissions associated with the scheduler 204-1 prior to scheduling the meeting. While not shown, the calendar server 212 and scheduler 204-1 may communicate information regarding availability of participants and resources and other scheduling information prior to scheduling the meeting.

The LAN 206-2 forwards 304 the conference call request and participant names to the firewall 210, which in turn forwards 305 the conference call request and participant names to the conference bridge 208. The conference bridge 208 communicates with the bridge database 280 to send 306 the conference call request and participant names and receive 207 a conference call identification or conference call ID. As discussed above, in some embodiments the bridge database 280 may be incorporated within the conference bridge 208 rather than being external to the conference bridge 208.

The bridge database 280 contains information relating to one or more conference calls and participants. For example, the bridge database 280 may include tables or mappings of participant names to participant passcodes. The bridge database 280 may include tables or mappings of conference call identifications, attendance status, participant permissions such as whether a particular participant is a moderator for a given conference call, etc. Examples of such tables and information will be described in further detail below with respect to FIG. 5.

The conference bridge 208 forwards 308 the conference call ID to the firewall 210, which forwards 309 the conference call ID to the LAN 206-2, which in turn forwards 310 the conference call ID to the calendar server 212. The calendar server 212 stores the conference call identification with the meeting record, and sends 311 a meeting confirmation to the LAN 206-2 for forwarding 312 to the scheduler 204-1.

While not explicitly shown in FIG. 3, in some embodiments the calendar server 212 may also send a meeting confirmation to each of the participants specified in the meeting request. This confirmation may be sent immediately to each participant currently connected to the calendar server 208, or may alternatively be queued such that when a participant next connects to the calendar server 212 the participant receives the meeting confirmation. The calendar server 212 may alternately send a meeting confirmation via an e-mail, text message, robocall, etc.

Figure 4:
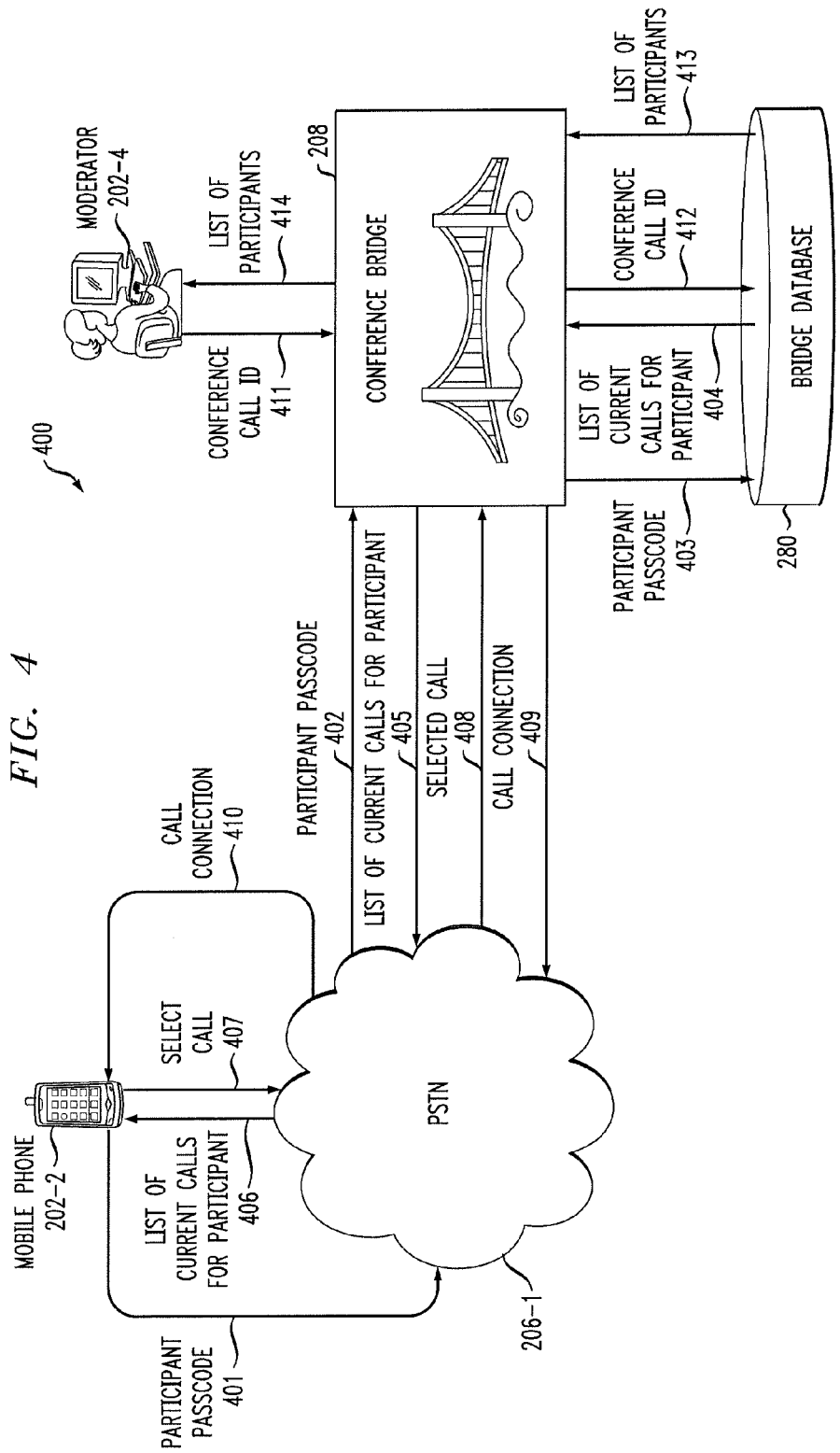
FIG. 4 illustrates connecting to a conference call bridge in the system of FIG. 2, according to an embodiment of the invention.

FIG. 4 illustrates a process flow 400 for connecting to a conference call bridge in the system 200 of FIG. 2. For clarity of illustration, some of the elements of system 200 are omitted in FIG. 3. A user device such as mobile phone 202-2 sends 401 a participant passcode to the conference bridge 208 via the PSTN 206-1, which forwards 402 the participant passcode to the conference bridge 208. The conference bridge 208 receives the participant passcode, and queries the bridge database 280 by sending 403 the participant passcode to the bridge database 280. The bridge database 280 returns 404 a list of currently scheduled conference calls for the participant associated with the participant passcode.

The conference bridge 208 then sends 405 the list of currently scheduled conference calls to the mobile phone 204-2 through the PSTN 206-1, which forwards 406 the list of currently scheduled conference calls to the mobile phone 204-2. The mobile phone 204-2 sends 407 a selection of one of the currently scheduled conference calls to the conference bridge 208 through the PSTN 206-1, which forwards 408 the conference call selection to the conference bridge 208. The conference bridge 208 establishes 409 a connection for the selected conference call with the PSTN 206-1 and the PSTN 206-1 establishes 410 the call connection with the mobile phone 204-2.

A moderator 204-2 may query 411 the conference bridge 208 with a particular conference call ID. The conference bridge 208 can forward 412 the query to the bridge database 280. The bridge database 280 returns 413 to the conference bridge 208 a list of participants for the conference call ID specified in the query. The conference bridge 208 can return 414 this list of participants to the moderator 202-4. While FIG. 4 shows a flow 400 wherein the moderator 202-4 queries a particular conference call ID to obtain a list of participants for a given conference call, embodiments of the invention are not limited solely to this arrangement. For example, a moderator 202-4 may specify a number of conference call identifications in a single query. A moderator 202-4 may also send a query seeking information on current or active participants in two or more conference calls. A moderator 202-4 may further query the conference bridge 208 with a particular participant name or identification to determine whether the given participant is connected to the conference bridge 208 or to a particular conference call.

In some embodiments, participants other than the moderator 202-4 may also query the conference bridge 208 for status information of a given conference call. For example, the mobile phone 202-2, before or after establishing the call connection, may send a query to the conference bridge 208 to determine a list of active participants for the selected conference call. The conference bridge 208 and/or the bridge database 280 may check permissions associated with a particular participant before responding to queries. For example, when a meeting and conference call are scheduled, such as for example, in steps 301-302 of flow 300, the scheduler 204-1 may specify that particular ones of the participants have access to particular information relating to a given conference call. In some embodiments, participants may be assigned a user class. When a meeting or conference call is scheduled, the scheduler 204-1 may specify particular user classes which have access to particular information rather than particular ones of the participants. A participant's personal code may be associated with his or her user class.

Figure 5:
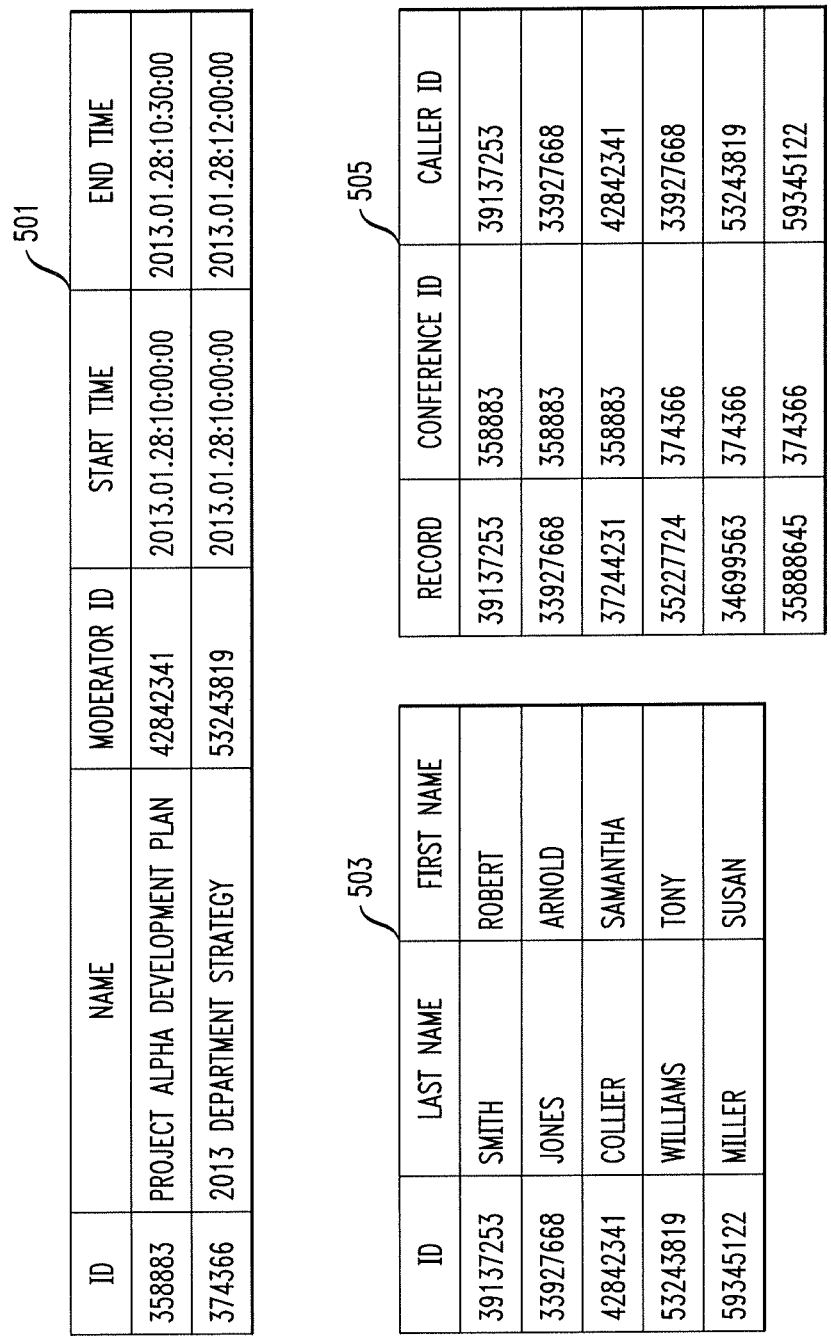
FIG. 5 illustrates information stored in a bridge database, according to an embodiment of the invention.

FIG. 5 illustrates examples of information which may be stored in a memory of a conference bridge or in a bridge database such as bridge database 280 in FIG. 2. Table 501 includes a list of scheduled conference calls. Each conference call has an identification or ID number, a name, a moderator identification or ID number, a start time and an end time. The table 501 in FIG. 5 lists particular entries for two conference calls. A conference bridge or bridge database may have all conference calls in a single table listing, or may have separate tables for conference calls associated with particular entities or with particular service levels.

A conference bridge or bridge database may also include a table 503 which associates participant identifications or IDs with participant names. The participant IDs may be the passcodes for the participants. While the participant IDs in table 503 are shown as a series of numbers, embodiments of the invention are not limited solely to passcodes comprising strings of numbers. Instead, embodiments of the invention may utilize text strings or symbols in place of or in addition to numbers. A participant can enter the passcode using a dial or other input of a user device. A participant passcode may alternatively be an auditory passcode or voice identification process. For example, a participant may speak his or her name, a phrase, or code into a microphone or other input of a user device. The conference bridge may have dedicated hardware or software modules implemented via processors and other hardware for voice recognition to authenticate a participant or convert a spoken name, phrase or code into an alphanumeric sequence. The passcode may be any number of other types, including authentication tokens, biometric authentication using fingerprints or retina scans, etc. In some embodiments, participant passcodes may comprise a combination of two or more of the above-described passcode types. In addition, some embodiments may use a multi-factor authentication with two or more passcodes.

The conference bridge or bridge database may also include a table 505 which lists conference IDs and participant IDs. When a participant connects to a conference bridge and inputs his or her personal passcode, the conference bridge may perform a table lookup using table 505 to determine which conference calls are currently scheduled for the participant. It is important to note that while FIG. 5 shows three separate tables 501, 503 and 505, in some embodiments a conference bridge or bridge database may combine information from two or more of these tables into a single table, or store the information in a given one of these tables in two or more separate tables. It is also important to note that the information stored in the bridge database or conference bridge need not be stored in the form of tables as shown in FIG. 5.

As shown in tables 501, 503 and 505, two conference calls are scheduled. Call 358883, the "Project Alpha Development Plan" call, is moderated by Samantha Collier and includes Arnold Jones and Robert Smith as participants. Call 374366, the "2013 Department Strategy" call, is moderated by Tony Williams and includes Arnold Jones and Susan Miller as participants. Since Arnold Jones is a participant in both calls, and since calls 358883 and 374366 have the same starting time, when Arnold dials into the conference bridge, the bridge will inform Arnold that the two calls are currently scheduled and prompt Arnold to select a given one of the calls. After Arnold joins a particular call, he would have the option of switching to the other call without disconnecting from the bridge. The conference bridge may be programmed with a set of automated messages for participants. A sample greeting message when a participant connects to the conference bridge is as follows:

Thank you for calling the conference bridge. Please choose between the following currently scheduled conference calls. One: 'Project Alpha Development Plan'. Two: '2013 Department Strategy." Please press zero for more options.

Participants may use dial pads or other input devices and methods such as voice recognition to navigate menus and options of the conference bridge.

Figure 6:
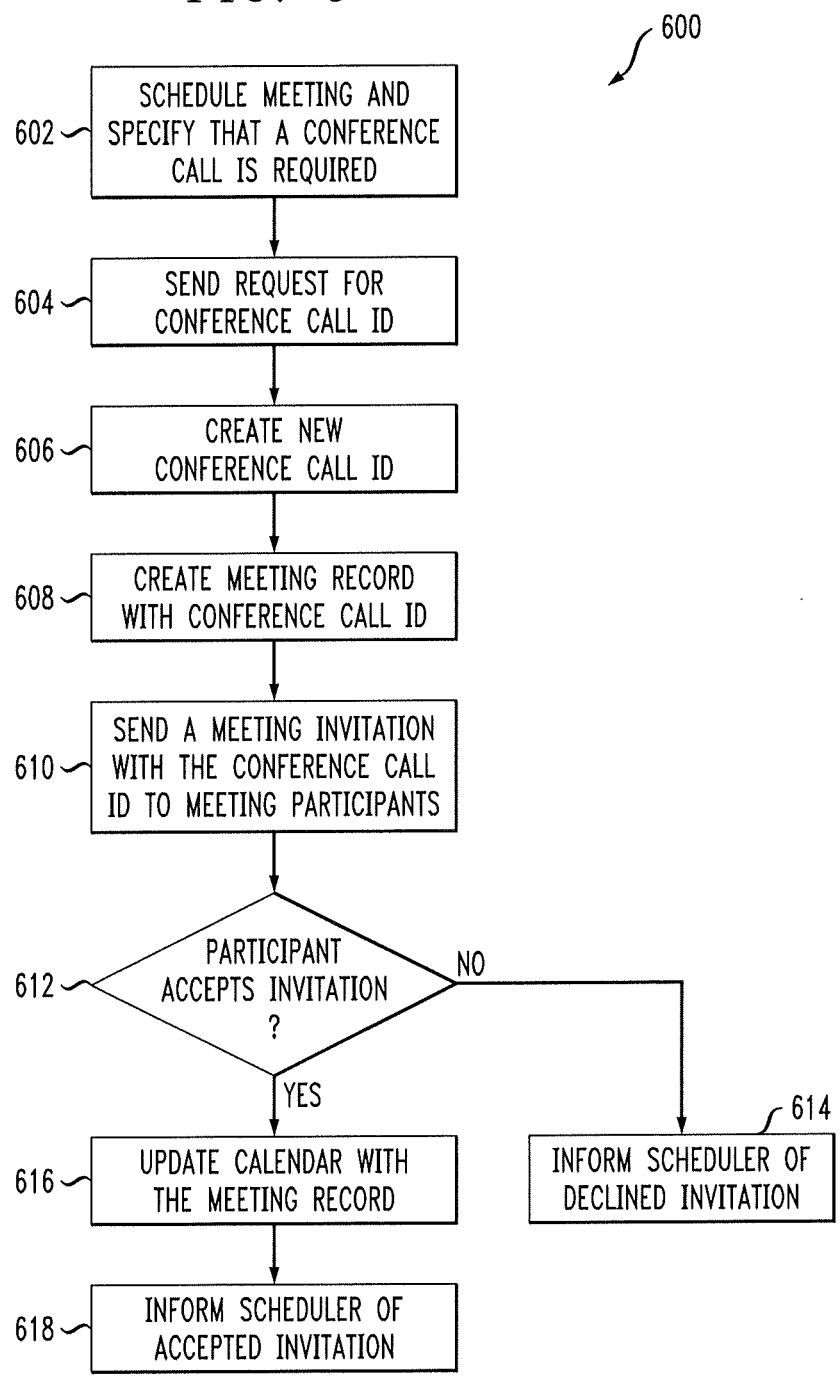
FIG. 6 illustrates a methodology for scheduling conference calls, according to an embodiment of the invention.

FIG. 6 illustrates a methodology 600 for creating conference calls. The methodology 600 begins with step 602, where a scheduler schedules a meeting and specifies that a conference call is required. The designation of scheduler as used herein refers to a user or participant who sets up a meeting and conference call. In some instances, the scheduler may also be a participant or moderator of the conference call. In other instances, the scheduler may set up the meeting and conference call but is not a participant or moderator of the conference call. Steps 301 and 302 in flow 300 of FIG. 3 are an example of step 602 in methodology 600.

In step 604, a request is sent for a new conference call ID. Next, a new conference ID is created 606. The methodology 600 continues with step 608 of creating a meeting record with the conference call ID. It is important to note that while methodology 600 describes creating a new meeting record and conference call, a scheduler, moderator or other participant may also modify an existing meeting record and conference call. Thus, instead of sending a request for a conference call ID in step 604, a scheduler may send a particular conference call ID which is to be modified or deleted. Steps 303-310 in flow 300 of FIG. 3 are an example of steps 604-608 in methodology 600.

Next, a meeting invitation with the conference call ID is sent 610 to the meeting participants. As described above, a meeting invitation may be sent using a variety of different communication techniques, including e-mails, text messages, robocalls, etc. In step 612, a determination is made as to whether particular participants have accepted the meeting invitation. If the participant declines the invitation, the methodology 600 informs 614 the scheduler of the declined invitation. If the participant accepts the invitation, the methodology 600 updates 616 a calendar with the meeting record and informs 618 the scheduler of the accepted invitation. Steps 311-312 in flow 300 of FIG. 3 are an example of steps 612-618 in methodology 600.

Figure 7:
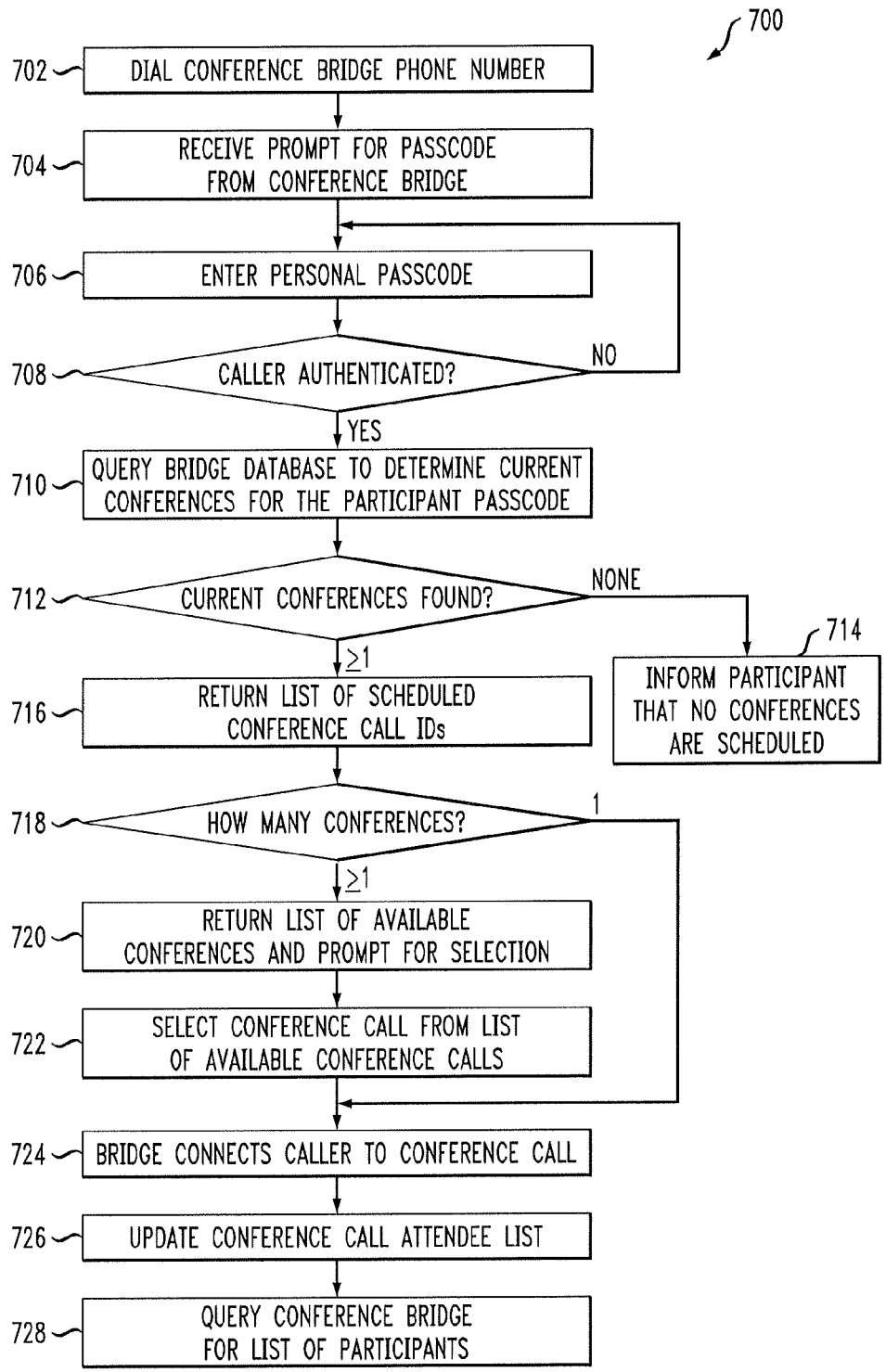
FIG. 7 illustrates a methodology for connecting to conference calls, according to an embodiment of the invention.

FIG. 7 illustrates a methodology 700 for connecting to conference calls. The methodology 700 begins with a participant dialing 702 a conference bridge phone number. In some embodiments of the invention, a conference bridge may also be associated with an Internet hyperlink such that a user may select or enter a hyperlink to connect to the conference bridge. Participants may also connect to the conference bridge using a voice over IP (VoIP) connection. A single conference bridge may be configured to connect to users over a variety of network types as described above.

In step 704, the conference bridge prompts the participant for a personal passcode. The participant enters 706 his or her personal passcode in response to the prompt. The conference bridge then makes a determination 708 as to whether a caller is authenticated. The conference bridge may determine whether the supplied personal passcode is a valid or active passcode and authenticate the user. For added security, in some embodiments the passcode which is personal to a user may be further tied to one or more devices. For example, a given participant may specify a set of devices for which the passcode is valid. If a user attempts to enter the personal passcode from a user device not in the specified set of devices, the conference bridge may deny authentication and request the participant to enter a new passcode. Alternatively, upon determining that a passcode is valid or active but that the user device is not in the specified set of devices, the conference bridge may request further information to authenticate the user or register and associate the user device with the personal passcode. Steps 401 and 402 in flow 400 of FIG. 4 are an example of steps 706-708 in methodology 700.

Once a participant is authenticated, the conference bridge queries 710 a bridge database to determine current conferences for the participant passcode. Step 403 in flow 400 of FIG. 4 is an example of step 710 in methodology 700. In step 712, a determination is made as to whether any currently scheduled conference calls are found corresponding to the participant passcode. If there are no currently scheduled conference calls, the conference bridge informs 714 the participant that there are no scheduled conference calls. If more than one currently scheduled conference call is found, the bridge database returns 716 a list of conference IDs for currently scheduled conference calls to the conference bridge. Step 404 in flow 400 of FIG. 4 is an example of step 716 in methodology 700.

In step 718, a determination is made as to how many conference calls are currently scheduled. If more than one conference call is scheduled, the conference bridge returns 720 a list of available conference call and prompts the participant for selection of one of the currently scheduled conference calls. This list may be presented to the participant via text messages, emails, audio messages, etc. Next the participant selects 722 a conference call from the list of available conference calls. Steps 405-408 in flow 400 in FIG. 4 are an example of steps 720 and 722 in methodology 700.

Once the participant selects a conference call in step 722 or if only a single conference call is determined to be scheduled in step 718, the conference bridge connects 724 the caller to the selected conference call. Steps 409 and 410 in flow 400 in FIG. 4 are an example of step 724 in methodology 700. In some embodiments, the participant may not connect to a conference call even if there is at least one currently scheduled conference call for the participant. Instead, as will be detailed below, a participant may choose to leave a message for the moderator, one or more participants or for the conference call itself.

After the caller is connected to the selected conference call in step 724, the conference bridge updates 726 the conference call attendee list. In step 728, a moderator or other participant can query the conference bridge for a list of participants in the conference call. Steps 411-414 in flow 400 of FIG. 4 are examples of steps 726 and 728 in methodology 700.

As described above, embodiments of the invention overcome a number of drawbacks of conventional approaches by utilizing passcodes which are personal to a participant. Thus, a participant need remember only a single passcode to connect to a number of conference calls, to schedule conference calls, and otherwise manage conference calls with a conference bridge and calendar server. The use of a passcode personal to the user allows for simple identification of which participants are currently on a particular call. In addition, when a participant joins a call, the conference bridge may automatically announce the identification of the participant through the association of participant passcodes to participant names. Moderators and other participants may also query the conference bridge to obtain lists of active participants of a conference call. Thus, if a participant joins a conference call after one or more other participants, he or she can determine other participants who are present without disrupting the flow of conversation in the conference call by asking who is currently on the call.

The conference bridge may provide a number of other features for conference calls. A conference bridge may permit participants to connect to a call before a moderator joins the call and permit participants to continue a call after a moderator exits. In addition, a conference bridge may permit conference calls without moderator participation at all. As described above, a participant may also switch between in-progress conference calls without disconnecting and re-dialing or otherwise reconnecting to the conference bridge.

In some embodiments, the conference bridge may also be configured for hybrid conference calls. A hybrid conference call may be one in which some users have personal passcodes while others users share an access code. A conference bridge which implements embodiments of the invention may also be configured for conventional conference calls where all participants share an access code.

In other embodiments, the conference bridge may be configured to allow users and participants to leave messages for a moderator of a conference call or for other participants of a conference call. For example, a participant scheduled to join a call can choose to leave a message for the moderator explaining why the participant will be late or unable to join a conference call. A participant may also leave a message for other specific participants or leave a message for the conference call as a whole. These messages may be sent to participants of the conference call through text messages, emails or audio messages.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but are not limited to, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-7, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-7, can also include, as described herein, providing a system, wherein the system includes distinct modules (e.g., modules comprising software, hardware or software and hardware).

Figure 8:
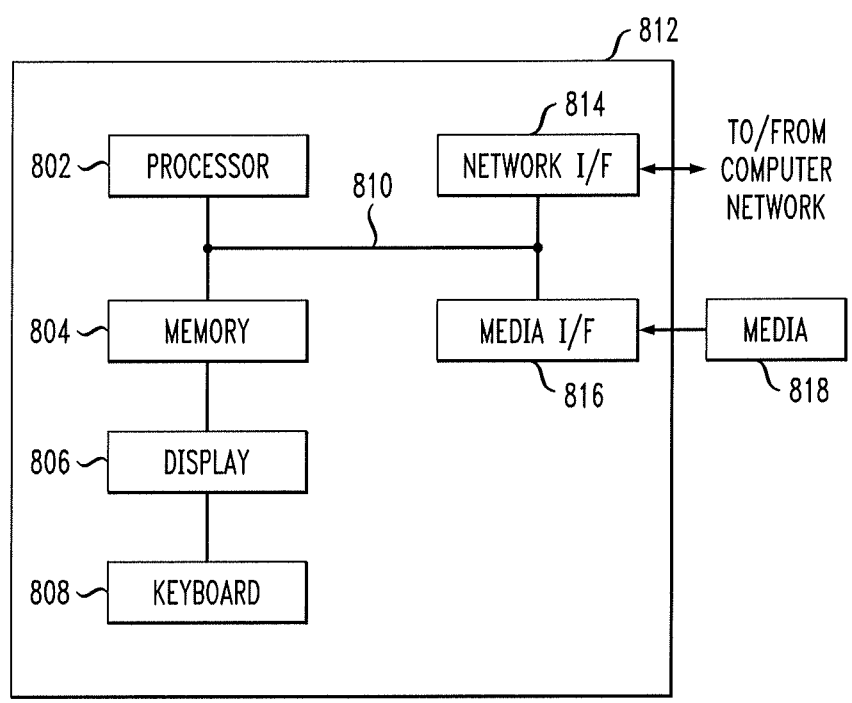
FIG. 8 illustrates a computing device in accordance with which one or more components/steps of techniques of the invention may be implemented, according to an embodiment of the invention.

One or more embodiments can make use of software running on a general purpose computer or workstation. With reference to FIG. 8, such an implementation may employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 802, memory 804, and input/output interface such as a display 806 and keyboard 808 can be interconnected, for example, via bus 810 as part of data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808 for making data entries; display 806 for viewing data; a pointing device for selecting data; and the like) can be coupled to the system either directly (such as via bus 810) or through intervening I/O controllers (omitted for clarity).

Network adapters such as a network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 812 as shown in FIG. 8) running a server program. It will be understood that such a physical server may or may not include a display and keyboard. Further, it is to be understood that components may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An article of manufacture comprising a non-transitory processor-readable storage medium for storing processor-readable program code which, when executed, causes a processing device to:
   connect to a conference call bridge;
   provide a passcode to the conference call bridge, the passcode being personal to a given user;
   authenticate to the conference call bridge using the passcode, wherein authenticating to the conference call bridge using the passcode permits the given user to connect to one or more conference calls by matching the passcode to an identifier of the given user and matching the identifier of the given user to the one or more conference calls;
   responsive to a successful authentication to the conference call bridge, obtain a list of conference calls for the given user;
   select a first one of the conference calls;
   join the first conference call via the conference call bridge; and
   subsequently join a second one of the conference calls without disconnecting from the conference call bridge.

2. The article of manufacture of claim 1, further comprising processor-readable program code which, when executed, causes the processing device to:
   responsive to the successful authentication to the conference call bridge, schedule a new conference call;

specify one or more participants for the new conference call; and obtain a conference call identification for the new conference call.

3. The article of manufacture of claim 2, further comprising processor-readable program code which, when executed, causes the processing device to:

send an invitation to the one or more participants for the new conference call, the invitation comprising the conference call identification.

4. The article of manufacture of claim 2, wherein specifying one or more participants for the new conference call further comprises specifying a moderator for the new conference call.

5. The article of manufacture of claim 3, further comprising processor-readable program code which, when executed, causes the processing device to:

store a conference call record for the new call in a scheduler.

6. The article of manufacture of claim 2, wherein specifying one or more participants for the new conference call further comprises specifying a set of passcodes, each of the passcodes being personal to a given one of the one or more participants.

7. The article of manufacture of claim 1, wherein a single passcode is utilizable for joining a plurality of conference calls.

8. The article of manufacture of claim 1, wherein obtaining the list of conference calls comprises querying a scheduler to determine conference calls available at a current time.

9. The article of manufacture of claim 1, wherein responsive to joining the first conference call, the conference call bridge sends a list of participants for the first conference call to a moderator of the first conference call.

10. The article of manufacture of claim 1, wherein the conference call bridge is configured to establish a given conference call with a first participant via a first network and a second participant via a second network, the second network being different than the first network.

11. The article of manufacture of claim 10, wherein the first network comprises a public switched telephone network and the second network comprises a local area network.

12. The article of manufacture of claim 1, wherein connecting to the conference call bridge comprises dialing a number associated with the conference call bridge.

13. An article of manufacture comprising a non-transitory processor-readable storage medium for storing processor-readable program code which, when executed, causes a processing device to:

connect to a given one of a plurality of user devices;

receive a passcode from the given user device, the passcode being personal to a given user;

authenticate the given user device using the passcode, wherein authenticating the given user device using the passcode permits the given user device to connect to one or more conference calls by matching the passcode to an identifier of the given user and matching the identifier of the given user to the one or more conference calls;

responsive to a successful authentication of the given user device, send a list of conference calls for the given user device;

receive a selection of a first one of the conference calls;

join the given user device to the first conference call via a conference call bridge; and subsequently join the given user device to a second one of the conference calls without disconnecting from the conference call bridge.

14. The article of manufacture of claim 13, further comprising processor-readable program code which, when executed, causes the processing device to:

responsive to the successful authentication of the given user device, receive a request from the given user device to schedule a new conference call specifying one or more participants for the new conference call;

generate a conference call identification for the new conference call; and send the conference call identification to the given user device.

15. A system comprising:

a plurality of user devices; and a conference call bridge connected to the plurality of end user devices via one or more networks;

wherein the conference call bridge is configured to:

connect to a given one of the plurality of user devices;

receive a passcode from the given user device, the passcode being personal to a given user;

authenticate the given user device using the passcode, wherein authenticating the given user device using the passcode permits the given user device to connect to one or more conference calls by matching the passcode to an identifier of the given user and matching the identifier of the given user to the one or more conference calls;

responsive to a successful authentication of the given user device, send a list of conference calls for the given user device;

receive a selection of a first one of the conference calls;

join the given user device to the first conference call; and subsequently join the given user device to a second one of the conference calls without disconnecting from the conference call bridge.

* * * * *